United States Patent

[11] 3,620,964

[72] Inventors William A. Stover
Woodbury;
Stephen M. Oleck, Moorestown, both of N.J.
[21] Appl. No. 743,334
[22] Filed July 9, 1968
[45] Patented Nov. 16, 1971
[73] Assignee Mobil Oil Corporation

[54] HYDROCRACKING CATALYST COMPOSITION, METHOD FOR MAKING THE SAME AND HYDROCRACKING IN THE PRESENCE THEREOF
20 Claims, No Drawings

[52] U.S. Cl. ................................................ 208/111,
252/455 Z
[51] Int. Cl. ............................................. C10g 13/02,
B01j 11/40
[50] Field of Search ......................................... 252/455 Z;
208/111

[56] References Cited
UNITED STATES PATENTS

| | | | |
|---|---|---|---|
| 3,304,254 | 2/1967 | Eastwood et al. | 208/111 |
| 3,325,397 | 6/1967 | Plank et al. | 252/455 X |
| 3,360,458 | 12/1967 | Young | 208/111 |
| 3,471,410 | 10/1969 | Oleck et al. | 252/455 X |

FOREIGN PATENTS

| 1,002,921 | 9/1965 | Great Britain | 208/111 |
|---|---|---|---|

Primary Examiner—Daniel E. Wyman
Assistant Examiner—C. F. Dees
Attorneys—Oswald G. Hayes, Donald L. Dickerson, Raymond W. Barclay and Charles J. Speciale ABSTRACT: A hydrocracking catalyst composition comprising a mixture of (1) a hydrogenation component deposited on a crystalline aluminosilicate, and (2) a matrix material impregnated with a hydrogenation component, a method for making the same comprising impregnating the matrix component with a diphase medium consisting of hydrogenation metals present as finely divided precipitate in a salt solution, or a medium consisting of a solution of hydrogenation metals, and admixing the resultant wet mix with a component as defined in (1), and hydrocracking in the presence thereof.

HYDROCRACKING CATALYST COMPOSITION, METHOD FOR MAKING THE SAME AND HYDROCRACKING IN THE PRESENCE THEREOF

BACKGROUND OF THE INVENTION

1. Field of the Invention

This invention relates to a hydrocracking catalyst composition of improved hydrocracking activity and strength, to methods for making the same and to hydrocracking in the presence thereof.

2. Description of the Prior Art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed by formula wherein the ratio of AL to the number of the various cations, such as Ca/2, Sr/2, Na, K, or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. Pat. No. 2,882,243), zeolite X (U.S. Pat No. 2,882,244), zeolite Y (U.S. Pat. No. 3,130,007), zeolite K-G (U.S. Pat. No. 3,055,654), zeolite ZK-5 (U.S. Pat. No. 3,247,195), and zeolite ZK-4 (U.S. Pat. No. 3,314,752), merely to name a few.

The use of catalyst compositions, comprising a mixture of a hydrogenation component, a zeolitic component and/or a carrier component, in hydrocracking operations, is, of course, well known.

Modern catalytic processes, however, require catalysts which are not only specifically active in the chemical reactions which are to be catalyzed but also possess physical characteristics requisite for successful commercial operation. One of the outstanding physical attributes of a commercial catalyst composition is the ability to resist attrition. The ability of a particle to hold its shape notwithstanding the mechanical handling to which it is subjected upon storage, shipment, and use, is a primary requirement for a successful catalyst and for modern catalytic processes. Furthermore, a catalyst composition must possess a high crushing strength in order to stand the rigors of commercial catalytic operation. Accordingly, it is desirable to utilize a hard, porous catalyst composition, i.e., characterized by a high crushing strength, having the ability to withstand abrasion during the necessary handling involved during commercial catalytic use.

SUMMARY OF THE INVENTION

It is, therefore, among one of the principal objectives of the invention to provide a hydrocracking catalyst composition of improved activity and strength, a method for making the same and hydrocracking therewith.

In accordance with the present invention, there is now provided a hydrocracking catalyst composition having such improved activity and strength, comprising a mixture of (1) a hydrogenation component selected from the group consisting of oxides of metals, sulfides of metals, and metals of Group VI and VIII of the Periodic Table and mixtures thereof deposited on a crystalline aluminosilicate, and (2) a matrix material also impregnated with said hydrogenation component, a method for making the same comprising impregnating the said matrix component with a diphase medium consisting of a solution of said hydrogenation metals present as finely divided precipitate in a salt solution and admixing the resultant wet mix with a component as defined in (1), and hydrocracking in the presence thereof. Alternatively, the matrix impregnating medium can consist of a salt solution of the hydrogenation metals.

This novel catalyst composition is characterized by a crushing strength of at least 8 pounds or more. While a crushing strength of upwards of 15 pounds or more can be obtained by the present method, for commercial application a crushing strength of about 8 pounds is satisfactory.

DESCRIPTION OF SPECIFIC EMBODIMENTS

The crystalline aluminosilicates employed in the preparation of the subject catalyst composition are of ordered internal structure and have a pore size between about 4 and 15 angstrom units. Particularly preferred are the rare earth exchanged forms of zeolites X and Y, and still more preferred, the rare earth exchanged form of zeolite X. The technique of such rare-earth exchange is described in U.S. Pat. No. 3,210,267.

The preferred catalyst composition comprises a 1:1 mixture of (1) a hydrogenation component, preferably nickel-tungsten, deposited on a crystalline aluminosilicate, preferably rare-earth exchange zeolite X, and (2) a matrix material, preferably fluid silica-alumina, impregnated with a hydrogenation component, preferably nickel-tungsten. However, the hydrogenation component need not be the same on the aluminosilicate portion and matrix material.

The catalyst composition of the invention is prepared by a novel preparational method called a diphase impregnation technique, which broadly involves preparing an impregnating medium consisting of hydrogenation metals present as a finely divided precipitate in a salt solution, impregnating separately the aluminosilicate component and the porous matrix material with said medium and thereafter blending the impregnated wet matrix mix with a dry portion of the hydrogenation metal impregnated crystalline aluminosilicate component. The use of such preparational method has yielded mixed catalysts which are (1) at least 5 times harder than conventionally prepared catalyst compositions, (2) at least as effective for hydrocracking to extinction of hydrocarbon charge stock blends having an initial boiling point of 450 to 925° F. and, in addition, (3) are at least 4 times more active in a functional dehydrogenation activity test than the prior art prepared catalysts. While, the crystalline aluminosilicate component may be impregnated by a multistep impregnation process, this is less preferred. However, it is essential that the matrix component be impregnated by the diphase impregnation technique. Alternatively, the matrix component may be impregnated with a salt solution of the hydrogenation metals.

The dehydrogenation metal employed in the subject catalyst composition is selected from the group consisting of oxides of metals, sulfides of metals, and metals of Group VI and VIII of the Periodic Table* and mixtures thereof. Particularly preferred is a mixed catalyst composition employing nickel-tungsten as the hydrogenation component on both the crystalline aluminosilicate portion and the matrix component.

*Handbook of Chemistry, 10th ed., McGraw Hill (1961).

The term "matrix" includes organic and/or inorganic compositions with which the hydrogenation metal impregnated crystalline aluminosilicate can be combined. It is to be understood that the porosity of the compositions employed as a matrix can either be inherent or can be introduced by a mechanical or chemical means. Representative matrices which can be employed include metals and alloys thereof, sintered metals and sintered glass, asbestos, silicon carbide aggregates, pumice, firebrick, diatomaceous earths, activated charcoal, refractory oxides, organic resins, such as polyepoxides, polyamines, polyesters, vinyl resins, phenolics, amino resins, melamines, acrylics, alkyds, epoxy resins, and inorganic oxide gels. Of these matrices, the inorganic oxide gels are particularly preferred because of their superior porosity, attrition resistance, and stability under reaction conditions. The inorganic oxide gel may also consist of a semiplastic or plastic clay mineral. The aluminosilicate can be incorporated in the clay simply by blending the two and fashioning the mixture into desired shapes. Suitable clays include attapulgite, kaolin, sepiolite, polygarskite, kaolinite, plastic ball clays, bentonite, montmorillonite, illite, and chlorite. These clays may be chemically treated.

The inorganic oxide gel may also consist of a plural gel comprising a predominant amount of silica with one or more metals or oxides thereof selected from Groups IB, II, III, IV, V, VI, VII and VIII of the Periodic Table. Particular preference is given to plural gels of silica with metal oxides of Groups IIA, III and IVA of the Periodic Table, especially wherein the metal oxide is magnesia, rare earth oxide, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Particularly preferred matrices include 100percent silica, 100percent alumina, and still more particularly, intermediate silica-alumina ratios; also the semisynthetics which consist partly of the above synthetic silica-alumina gel and partly of clay, also silica-zirconia, silica-zirconia-alumina, silica-zirconia-clay, or the like. Especially preferred is a commercially available fluid silica-alumina containing 13 weight percent alumina.

As mentioned in a preferred embodiment, the hydrocracking catalyst of the invention comprises a 1/1 mixture of a nickel-tungsten impregnated rare earth zeolite X component (Ni-W/REX) and a nickel-tungsten impregnated silica-alumina component (Ni-W/SiO$_2$-Al$_2$O$_3$). The total preferred composite contains 4 weight percent nickel and 10 weight percent tungsten, the amorphous silica-alumina portion containing 13 weight percent alumina. While the mixed catalyst is preferably in a ratio of 1/1, it is within the scope of the invention to employ ratios of between 20/1 to 1/20. Similarly, the amount of nickel can be from 1 to 20 weight percent, while the amount of tungsten can be from 5 to 40 weight percent.

Briefly, the method of preparing the aforesaid preferred catalyst composition comprises mixing the REX component (containing 0.6 weight percent sodium) with an ammonium metatungstate solution or an ammonium paratungstate solution, or a mixture of both, drying the resultant solution at about 250° F., mixing in another portion of tungsten as in the above solution, again drying at 250° F., thereafter mixing in nickel as nickel nitrate solution in water and then drying the resultant solution at 250° F. This dry composite is then admixed with a wet mix of nickel-tungsten amorphous silica-alumina portion which is prepared by impregnating a fluid silica carrier with a combined ammonium tungstate and nickel nitrate in water solution. The final composite is mixed with an extrusion aid and water and extruded, followed by drying at 250° F. and calcining in air for 3 hours at 1,000° F. It is an essential feature of the present method that the impregnated silica-alumina portion not be dried nor that the silica-alumina portion be heated in a way that destroys its essential plasticity, whether before impregnation or after impregnation, before its admixture with the dry aluminosilicate component, since this has been found to bear directly on the strength and extrudability of the catalyst composite. The adverse effects of heat on the matrix component are shown in the properties of the catalyst made by the method of examples 1 and 2, set forth hereinbelow. While the impregnated aluminosilicate component is preferably dry when admixed, it may also be in the wet state, i.e., the drying steps described above may be omitted.

Typical hydrocracking conditions for use of the subject catalyst may range as follows:

1,000–2,000 p.s.i.g. pressure
0.2–3 LHSV
5,000–15,000 H$_2$ circ. scf/B
500°–700° F. Temperature The invention will be described with reference to the following specific examples which are merely illustrative in nature and are not intended to limit the invention thereto.

Examples 1 to 3, set forth below for ease of illustration in flow diagram form, demonstrate the preparation of the nickel-tungsten rare earth exchange zeolite X portion (NiW/REX), (example 1) of the invention composition, the preparation of the nickel-tungsten silica-alumina portion (NiW/SA) thereof (example 3) and the preparation by conventional means of a separate nickel-tungsten silica-alumina portion (example 2). The products of examples 2 and 3 were each combined with a separate portion of the NiW/REX portion of example 1, in a 1:1 weight ratio, respectively.

The ammonium tungstate solution was prepared by adding 400 cc. of water and 500 cc. of concentrated ammonium hydroxide to 225 g. of tungstic acid in a flask. The mixture was heated to between 140°–160° F. and held at that temperature with stirring until all the tungstic acid dissolved. The solution was then allowed to cool to room temperature.

Detailed preparational diagrams are given in the table below for the two catalysts, prepared above, which illustrate the invention. They are compared below:

TABLE 1

| Composition | 50 wt. Ni-W-SiO$_2$Al$_2$O$_3$ | 50 wt. Ni-W-REX |
| --- | --- | --- |
| Catalyst Made by Examples | 1 & 3 | 1 & 2 |
| Impregnation of SiO$_2$-Al$_2$O$_3$ | | |
| Diphase | Yes | No |
| Two step | No | Yes |
| Drying of impregnated SiO$_2$-Al$_2$O$_3$ before mixing with dried Ni-W-REX | No | Yes |
| Multistep impregnation of REX | Yes | Yes |
| Properties | | |
| Crushing strength, lb.* | 15 | 3 |
| Functional DA TEST** | | |
| % Benzene in product | 6.4 | 1.6 |

*Crushing strength is determined by placing each of about 25 extrudate pellets between two flat surfaces measuring the force needed to crush the pellet and calculating average. The values obtained are based on 3/32 inch diameter extrudates of about 5/32–9/32 inch length.

**The functional dehydrogenation activity (DA) test is done according to the following procedures: catalyst is treated for 30 minutes at 800° F. in H$_2$, cooled to 600° F. at 0.4 LHSV. Pressure is one atmosphere. The product is analyzed for benzene which indicated dehydrogenation ability.

Example 1

Nickel tungsten REX portion of each catalyst 535 g. of REX from bead plant calciner
 0.6% wt. Na
 90% crystallinity
 94% solids Mix in 45 g. W as 15.7% wt. W ammo. tungstate solution Dry at 250° F.

Mix in 13 g. W as above solution

Dry at 250° F.

Mix in 23 g. Ni as 115 g. Ni(NO₃)₂·6H₂O in 200 cc. water

Dry at 250° F.

Mix in Ni-W-SiO₂·Al₂O₃ portion

Mix in 3% starch (31 g.)

Mix in water:
 750 cc. for combining with the product of Example 2
 240 cc. for combining with the product of Example 3

Extrude twice through 3/32" dia.
Dry at 250° F., calcine in air 3 hrs. at 1,000° F.

Example 2

Nickel tungsten silica alumina portion [1]

598 g. of fluid silica, 13% alumina, Am. Cy. Aerocat 84% solids 58 g. W as 15.7% wt. W ammo. tungstate solution Dry at 250° F.

23 g. Ni as 115 g. of Ni(NO₃)₂·6H₂O in 200 cc. water

Dry at 250° F.

Blend with Ni-W-REX portion of Example 1

Example 3

Nickel tungsten silica alumina portion [2]

568 g. of fluid silica, 13% alumina, Nalco 88% solids 58 g. W as 15.7% ammo. tungstate solution 23 g. Ni as 115 g. Ni(NO₃)₃·6H₂O in 50 cc. water Blend with Ni-W-REX portion of Example 1

---

[1] Conventional preparation.
[2] Invention preparation.

It can be seen from the results shown in table 1 that the invention catalyst, i.e., made by combining the products of examples 1 and 3, is five times harder than the conventionally prepared catalyst (example 1 & 2) and four times more active.

Table 2 shows detailed diagrams also serving as examples of the invention for catalysts which represent the individual components going into the mixed catalyst. They are compared below.

TABLE 2

|  | Ni-W-SiO₂/Al₂O₃ Component made by Example 3 | Ni-W-SiO₂/Al₂O₃ Component made by Example 2 |
| --- | --- | --- |
| Diphase impregnated | Yes |  |
| Multiple step impreg. | No | Yes |
| Properties of Finished Cat. |  |  |
| Crushing Strength, lb. | 20 | 3 |
| Functional DA test, % benzene in product | 10.8 | 1 |

Comparison of the first and second column results shows that diphase impregnation technique of the silica/alumina gave a much harder and much more active (as measured by the functional DA) catalyst than the multistep impregnation technique.

In the table below, serving as additional examples of the invention, there are compared the properties of the mixed catalysts of the invention made by varying the impregnation procedure of the rare earth exchanged aluminosilicate portion. The procedure used in making the catalyst of example 4 (in the table) is essentially the same as that of examples 1 and 3, except that the impregnated REX component of the catalyst of example 4 was prepared by the diphase impregnation technique.

TABLE 3.—COMPARISON OF PROPERTIES OF MIXED CATALYSTS MADE BY VARYING THE IMPREGNATION PROCEDURE OF THE REX PORTION

|  | Catalyst made by Examples 1 and 3 | Catalyst made by Example 4 |
| --- | --- | --- |
| Hydrocracking test: |  |  |
| Temp. for 60% conversion, °F | (¹) | (¹) |
| Recycle gravity, API | 39–40 | 34 |
| 650° F. in recycle, percent | 25 | 50–60 |
| Impregnation: |  |  |
| REX component | (²) | Diphase |
| SiAl | Diphase | Diphase |
| DA (atm.) percent C₆H₆: |  |  |
| NWREX component | 2.8 |  |
| NWSA component | 10.8 | 10.8 |
| Total catalyst | 6.4 | 4.4 |

| | | |
| --- | --- | --- |
| α (relative activity) 700° F.:*** | | |
| NWREX component | 100 | 261 |
| NWSA component | 4 | 4 |
| Total catalyst | 245 | 600 |
| Properties of NWREX: | | |
| Surface area, m.²/g | 366 | 368 |
| Cryst. percent | 30 | 40 |
| Cyclohexane ads., percent | 11.0 | 10.6 |
| Crush strength, lb. | 4 | 17 |
| Relative cracking furfural extract/n-C₁₆ **** | 1.3 | 2.8 |
| Properties of total catalyst: | | |
| Packed density, g./cc. | 0.76 | 0.75 |
| Surface area m.²/g | 339 | 361 |
| Cryst., percent | 25 | 20 |
| Crushing strength, lb. | 15 | 16 |
| Ni, percent wt. | 3.6 | 3.7 |
| W., percent wt. | 10.0 | 9.6 |

¹ Equivalent.
² Multi-step.

*** Cracking activity is obtained by a standard α-test which is fully described in a letter to the editor entitled "Superactive Crystalline Aluminosilicate Hydrocarbon Catalysts," by P. B. Weisz and J. N. Miale, appearing in "Journal of Catalysis" vol. 4, No. 4, August 1965, pp. 527–529.

**** Test conditions were 1,500 p.s.i.g., LHSV 1, H₂ 7,000 s.c.f./B, and charge 50/50. Pretreated 650 plus secondary furfural extract bottoms/n-C₁₆. Conversion of n-C₁₆+ and n-C₁₆ were calculated from products, and the ratio of these is the number reported. This shows selectivity for cracking heavy polynuclear compounds which is important for stability of this type of catalyst.

Comparison of the results above will show that the catalyst of Example 4 had a higher α (relative activity) at 700° F. than the other catalyst but that the crushing strength of the two catalysts were about the same.

What is claimed is:

1. A method for preparing a hydrocracking catalyst composition comprising a mixture of (1) a crystalline aluminosilicate of ordered internal structure and uniform pore diameter impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII OF THE Periodic Table and mixtures thereof, and (2) a matrix material impregnated with a hydrogenation metal component selected from the group consisting of an oxide of a metal of Groups VI and VIII of the Periodic table, a sulfide of a metal of Groups VI and VIII of the Periodic Table, and a metal of Groups VI and VIII of the Periodic Table and mixtures thereof, which comprises preparing an impregnating medium consisting of said hydrogenation metal present in a salt solution thereof, impregnating separately the aluminosilicate component and the matrix component with said impregnating medium and thereafter combining the resultant impregnated wet matrix mix with the resultant impregnated crystalline aluminosilicate, said matrix component not being subjected to heat, at any time, in a way that destroys its essential plasticity before its admixture with said impregnated crystalline aluminosilicate component.

2. A method for preparing a hydrocracking catalyst composition comprising a mixture of (1) a crystalline aluminosilicate of ordered internal structure and uniform pore diameter impregnated with a hydrogenation metal component selected from the group consisting of an oxide of a metal of Groups VI and VIII of the Periodic table, a sulfide of a metal of Groups VI and VIII of the Periodic Table, and a metal of Groups VI and VIII of the Periodic Table and mixtures thereof, and (2) a matrix material impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, which method comprises preparing an impregnating diphase medium consisting of said hydrogenation metal present as a finely divided precipitate in a salt solution thereof, impregnating separately the aluminosilicate component and the matrix component with said impregnating medium and thereafter combining the resultant impregnated wet matrix mix with the resultant impregnated crystalline aluminosilicate component, said matrix component not being subjected to heat, at any time, in a way that destroys its essential plasticity before its admixture with said impregnated crystalline aluminosilicate component.

3. The method of claim 2 wherein the hydrogenation metal impregnated crystalline aluminosilicate component and matrix component are admixed in a weight ratio of about 1:1.

4. The method of claim 2 wherein said crystalline aluminosilicate is a rare earth exchanged X-type zeolite, and said matrix is a silica-alumina gel.

5. The method of claim 4 wherein said hydrogenation component is a mixture of nickel and tungsten and the total catalyst composition contains about 4 weight percent nickel and about 10 weight percent tungsten.

6. The method of claim 2 wherein component (1) and (2) are in admixture in a weight ratio of between about 20:1 and 1:20.

7. The method of claim 6 wherein components (1) and (2) are in admixture in a weight ratio of about 1:20.

8. The method of claim 6 wherein components (1) and (2) are in admixture in a weight ratio of about 20:1.

9. The method of claim 4 wherein said hydrogenation component is a mixture of nickel and tungsten, and the total catalyst composition contains between about 1 and 20 weight percent nickel and between about 5 and 40 weight percent tungsten.

10. A method for preparing a hydrocracking catalyst composition comprising a mixture of (1) a crystalline aluminosilicate of ordered internal structure and uniform pore diameter impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, and (2) a matrix material impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, wherein said crystalline aluminosilicate is a rare earth exchanged X-type zeolite, said matrix is a silica-alumina gel, said hydrogenation component is a mixture of nickel and tungsten, and the total catalyst composition contains between about 1 and 20 weight percent nickel and between about 5 and 40 weight percent tungsten, which method comprises impregnating said crystalline aluminosilicate component with said nickel and tungsten by multistep impregnation with respective salt solutions thereof, drying the resultant nickel-tungsten impregnated rare earth exchanged X-type zeolite, preparing an impregnating diphase medium consisting of said nickel and tungsten present as finely divided precipitates in a salt solution thereof, impregnating the silica-alumina gel with said diphase medium and thereafter combining the resulting impregnated wet silica-alumina mix and the resultant dried impregnated rare earth exchanged X-type zeolite, said matrix component not being subjected to heat, at any time, in a way that destroys its essential plasticity before its admixture with said impregnated crystalline aluminosilicate component.

11. The method of claim 2 wherein said salt solution is an ammonium salt solution.

12. The method of claim 10 wherein said tungsten is present as ammonium metatungstate.

13. The method of claim 10 wherein said tungsten is present as ammonium paratungstate.

14. The method of claim 1 wherein said impregnated aluminosilicate component is dried prior to combining with said impregnated wet matrix component, and said impregnated wet matrix mix is thereafter combined with said dried hydrogenation metal impregnated crystalline aluminosilicate component.

15. The method of claim 2 wherein said impregnated aluminosilicate component is dried prior to combining with said impregnated wet matrix component, and said impregnated wet matrix mix is thereafter combined with said dried hydrogenation metal impregnated crystalline aluminosilicate component.

16. The method of claim 1 wherein said salt solution is an ammonium salt solution and the hydrogenation metal consists of a mixture of nickel and tungsten, said tungsten being present as the ammonium metatungstate.

17. A hydrocracking catalyst composition comprising a mixture of (1) a crystalline aluminosilicate of ordered internal structure and uniform pore diameter impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, and (2) a matrix material impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, produced by the process of claim 1.

18. A hydrocracking catalyst composition comprising a mixture of (1) a crystalline aluminosilicate or ordered internal structure and uniform pore diameter impregnated with a hydrogenation metal component selected from the group consisting of an oxide of a metal of groups VI and VIII of the Periodic Table, a sulfide of a metal of Groups VI and VIII of the Periodic Table, and a metal of Groups VI and VIII of the Periodic Table and mixtures thereof, and (2) a matrix material impregnated with a hydrogenation metal component selected from the group consisting of an oxide of a metal of Groups VI and VIII of the Periodic Table, a sulfide of a metal of Groups VI and VIII of the Periodic Table, and a metal of Groups VI and VIII of the Periodic Table and mixtures thereof, produced by the process of claim 2.

19. A process for hydrocracking a hydrocarbon charge stock having an initial boiling point between about 450° and 925° F. which comprises contacting said charge stock with the catalyst of claim 17 under catalytic hydrocracking conditions of 1,000–2,000 pounds pressure, 0.2–3 LHSV throughput, 5,000–15,000 s.c.f./B.H.$_2$ circulation rate, and a temperature of 500–900° F.

20. A process for hydrocracking a hydrocarbon charge stock having an initial boiling point between about 450° and 925° F. which comprises contacting said charge stock with the catalyst of claim 18 under catalytic hydrocracking conditions of 1,000–2,000 pounds pressure, 0.2–3 LHSV throughput, 5,000–15,000 s.c.f./B.H.$_2$ circulation rate, and a temperature of 500°–900° F.

* * * * *

PO-1050
(5/69)

UNITED STATES PATENT OFFICE
CERTIFICATE OF CORRECTION

Patent No. 3,620,964          Dated November 16, 1971

Inventor(s) William A. Stover and Stephen M. Oleck

It is certified that error appears in the above-identified patent and that said Letters Patent are hereby corrected as shown below:

Column 4, line 74        "to 600°F. at 0.4 LHSV" should be --to 600°F. and cyclohexane is run over catalyst at 600°F. at 0.4 LHSV.--

Column 5, line 41        " " should be --NO-- (third column)

Column 6, line 67        "which comprises" should be --which method comprises--

Column 8, line 45        "or ordered" should be --of ordered--

Signed and sealed this 30th day of May 1972.

(SEAL)
Attest:

EDWARD M. FLETCHER, JR.
Attesting Officer

ROBERT GOTTSCHALK
Commissioner of Patents